G. W. RAY.
Wheel-Cultivator.
No. 205,417. Patented June 25, 1878.
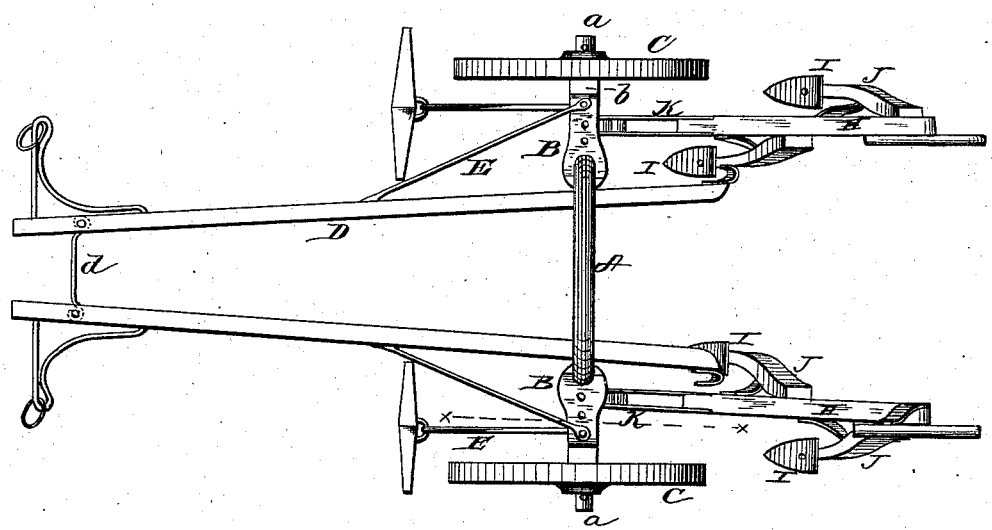
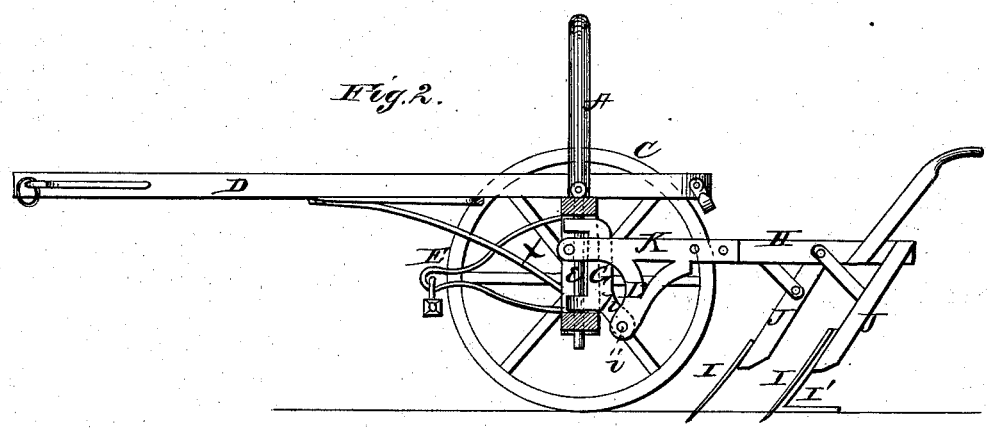
WITNESSES
INVENTOR
George W. Ray
ATTORNEYS

UNITED STATES PATENT OFFICE.

GEORGE W. RAY, OF WATSON, MISSOURI.

IMPROVEMENT IN WHEEL-CULTIVATORS.

Specification forming part of Letters Patent No. 205,417, dated June 25, 1878; application filed November 17, 1877.

*To all whom it may concern:*

Be it known that I, GEORGE W. RAY, of Watson, in the county of Atchison, and in the State of Missouri, have invented certain new and useful Improvements in Wheel-Cultivators; and do hereby declare that the following is a full, clear, and exact description thereof, reference being had to the accompanying drawings, and to the letters of reference marked thereon, making a part of this specification.

The nature of my invention consists in the construction and arrangement of a cultivator, as will be hereinafter more fully set forth.

In order to enable others skilled in the art to which my invention appertains to make and use the same, I will now proceed to describe its construction and operation, referring to the annexed drawing, in which—

Figure 1 is a plan view of my improved cultivator. Fig. 2 is a side elevation of the same, with one of the side frames in section, on the line $x$ $x$, Fig. 1.

A represents the arched axle, having a frame, B, swiveled upon each end. To the outer side of each frame B is attached a plate, $b$, from which the spindle $a$ projects to receive the wheel C. To the inner side of each frame B is attached the tongue D, strengthened by means of a brace, E, as shown. The front ends of the two tongues D D are connected by a pivoted bar or link, $d$, which allows of the backward and forward movement of the parts independent of each other. In each frame B is, by means of a rod, $e$, pivoted a bar, G, which can thus swing to the right or left.

H H represent the plow-beams, provided with the ordinary plow standards or feet J and plows I. Each beam H has a clevis, K, extending forward on a line with the beam, the two arms of the clevis straddling the bar G and rod $e$, and has a pin, $x$, through their forward ends in front of said rod.

From the arms of the clevis K depend hangers L, which are pivoted at their lower ends to an arm, $h$, projecting from the bar G. It will thus be seen that the pivot-point $i$ of the plow-beam is dropped down below the beam, which is of great importance in cultivators.

By practical experiments I have found that the lower the pivot is placed the better the work the plows will do, and the easier they are regulated and controlled. For this reason I drop the pivot down below the line of the beam, and, according to the work designed to be done, such pivot is more or less below the beam.

When the pivot is placed very low it gives rise to the necessity of using a bar, I', to run behind the rear plow on each beam and slide on the bottom of the furrow. The gangs, however, will run reasonably steady without such bar, but it is used in order the better to regulate the depth of the furrow and steady the gangs.

Having thus fully described my invention, what I claim as new, and desire to secure by Letters Patent, is—

1. In a cultivator, the plow-beam having the pivot that connects it to the frame dropped down below the beam, substantially for the purposes herein set forth.

2. The combination, with a cultivator-beam, of a clevis, or its equivalent, having hangers attached to or projecting from it for dropping down the pivot below the beam, as herein set forth.

3. The combination of the swiveled bar G with arm $h$, the beam H with clevis K, hangers L, and pivot $i$, all as and for the purposes herein set forth.

In testimony that I claim the foregoing I have hereunto set my hand this 16th day of October, 1877.

GEORGE W. RAY.

Witnesses:
R. W. HARRIS,
W. H. BLADES.